F. W. BARNES.
MOTION PICTURE APPARATUS.
APPLICATION FILED OCT. 15, 1917.
1,269,366.
Patented June 11, 1918.
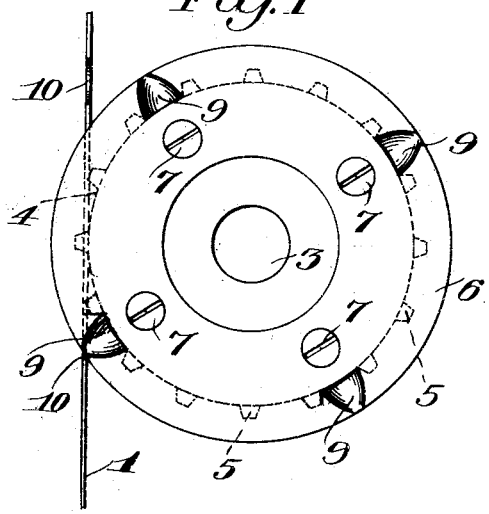
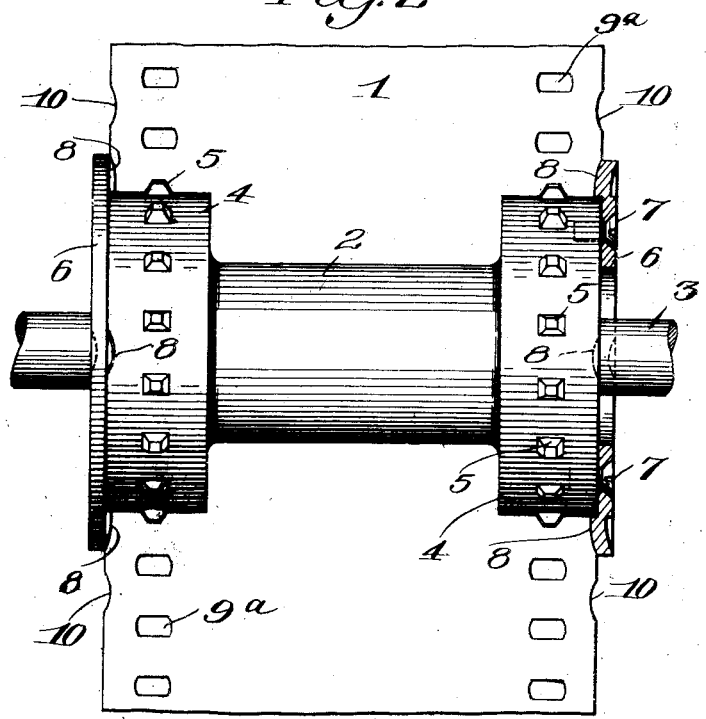
WITNESSES:
INVENTOR.
Frederick W. Barnes
BY
his ATTORNEYS.

UNITED STATES PATENT OFFICE.

FREDERICK W. BARNES, OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

1,269,366.  Specification of Letters Patent.  Patented June 11, 1918.

Application filed October 15, 1917. Serial No. 196,613.

*To all whom it may concern:*

Be it known that I, FREDERICK W. BARNES, of Rochester, in the county of Monroe and State of New York, have invented certain new and useful Improvements in Motion-Picture Apparatus; and I do hereby declare the following to be a full, clear, and exact description of the same, reference being had to the accompanying drawings, forming a part of this specification, and to the reference-numerals marked thereon.

My present invention relates to optics and more particularly to motion picture apparatus and it has for its object to provide a machine for projecting motion picture film that will prevent the use of other than a prescribed type of film. For instance, in certain places, particularly educational institutions, operators are required to use only non-inflammable film. In the practice of my invention, inflammable film cannot be used in the apparatus provided though the special non-inflammable film provided may be used in ordinary apparatus designed for the use of inflammable film. To this end, the invention contemplates a novel construction of film strip and also a novel construction of the apparatus by which it is handled. To these and other ends the invention resides in certain improvements and combinations of parts all as will be hereinafter more fully described, the novel features being pointed out in the claims at the end of the specification.

In the drawing:

Figure 1 is a side view of a motion picture apparatus constructed in accordance with and illustrating one embodiment of my invention, and Fig. 2 is a side view thereof.

Similar reference numerals throughout the several views indicate the same parts.

In the practice of my invention I so coordinate the picture or film strip and the gearing through which it passes or by which it is driven that a film of a different form can not be used. I have illustrated in a fragmentary manner a portion 1 of the film strip and one of the sprocket drums 2 over which it passes in the usual general form of projector and by which it is driven. The shaft of the sprocket drum is indicated at 3 and the sprockets that actually engage the film at 4. These sprockets are provided with the usual equally-spaced tapered teeth 5 but at their ends I provide annular flanges 6 that may be secured to the sprockets by screws 7. The distance across the drum between the inner faces of the flanges 6 is just equal to the width of the film strip for which the apparatus is adapted and on these inner faces of the flanges I provide equally spaced lugs or projections 8 the distance between which across the drum is appreciably less than the width of the film strip. In the present instance, I have formed these lugs or projections by stamping out protuberances on the flange plates, the indented portions of which on the outside are indicated at 9 in Fig. 1. The lugs are located at points opposite intervals between adjacent sprocket teeth 5 and I prefer to place them as shown so that four sprocket teeth intervene between each pair of lugs.

The film 1 has the usual equally spaced perforations 9ª in its margins to receive the sprocket teeth 5 and it is of a width to fit closely between the flanges 6. To escape the lugs or projections 8, it is provided in its edges with equally spaced notches 10 in which the said lugs engage, there being, in the present instance, four intervening perforations 7 between each pair of notches 10. The latter are located opposite the intervals between notches.

A projecting machine having a drum of the character described is provided where only non-inflammable film is to be used and hence inflammable film, the edges of which are regular and not provided with notches 10, cannot be accommodated because the lugs 8 interfere with its travel and ride it off of the drum or prevent the sprocket teeth 5 from engaging. It is obvious, however, that the non-inflammable film 1 can be used not only in the present apparatus but upon any machine adapted for inflammable film where its notches 10 are not utilized but are nevertheless not capable of interfering in any way with the running of the film strip.

The notches 10 need not be made very deep and being placed opposite the solid portions intervening between sprocket perforations 9ª, they do not materially weaken the strip as a whole nor do they weaken the material in the immediate neighborhood of the perforations 9ª so that the latter would be apt to tear out or chip. Neither is the expense of manufacturing the film increased as the notches 10 may be cut at the same time as the perforations 9ª.

I claim as my invention:

1. A moving picture film strip having the usual equally spaced sprocket perforations in its margins and also provided with equally spaced notches in its edges at points opposite intervals between the sprocket perforations, said notches being distributed throughout the length of the film with a frequency equal to at least half that of the picture areas on the film, for the purposes set forth.

2. In a motion picture machine, a film strip feeding sprocket drum provided with the usual sprocket teeth and having end flanges formed with lugs projecting inwardly opposite intervals between the sprocket teeth and into the path of the extreme lateral edges of a film of the width for which the machine is adapted.

3. In a motion picture machine, the combination with a film strip feeding sprocket drum provided with the usual sprocket teeth equally spaced apart, and having end flanges formed with equally spaced lugs projecting inwardly opposite intervals between the sprocket teeth, of a film strip having the usual equally spaced sprocket perforations in its margins to coöperate with the sprocket teeth and also provided with equally spaced notches in its edges at points opposite intervals between the sprocket perforations to coöperate with the lugs.

FREDERICK W. BARNES.

Witnesses:
M. B. HAMBLET,
K. E. GRAGION.